United States Patent
Hughes et al.

(10) Patent No.: US 9,982,086 B2
(45) Date of Patent: May 29, 2018

(54) EPOXY RESIN COMPOSITION, PREPREG, FIBER REINFORCED PLASTIC MATERIAL, AND MANUFACTURING METHOD FOR FIBER REINFORCED PLASTIC MATERIAL

(71) Applicant: TORAY INDUSTRIES, INC., Tokyo (JP)

(72) Inventors: Johnathan C Hughes, Tacoma, WA (US); Hiroaki Sakata, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days. days.

(21) Appl. No.: 14/759,621

(22) PCT Filed: Jan. 7, 2014

(86) PCT No.: PCT/US2014/010497
§ 371 (c)(1),
(2) Date: Jul. 7, 2015

(87) PCT Pub. No.: WO2014/107725
PCT Pub. Date: Jul. 10, 2014

(65) Prior Publication Data
US 2016/0002390 A1 Jan. 7, 2016

Related U.S. Application Data

(60) Provisional application No. 61/749,703, filed on Jan. 7, 2013, provisional application No. 61/911,386, filed on Dec. 3, 2013.

(51) Int. Cl.
| | |
|---|---|
| *B32B 27/38* | (2006.01) |
| *B32B 27/26* | (2006.01) |
| *B32B 27/04* | (2006.01) |
| *C08J 5/24* | (2006.01) |
| *C08G 59/38* | (2006.01) |
| *C08G 59/40* | (2006.01) |
| *C08L 63/00* | (2006.01) |
| *C08G 59/14* | (2006.01) |
| *C08G 59/32* | (2006.01) |
| *C08G 59/68* | (2006.01) |

(52) U.S. Cl.
CPC ..... *C08G 59/1477* (2013.01); *C08G 59/3227* (2013.01); *C08G 59/38* (2013.01); *C08G 59/4021* (2013.01); *C08G 59/686* (2013.01); *C08J 5/24* (2013.01); *C08L 63/00* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 4,480,082 A | 10/1984 | McLean et al. | |
| 7,005,185 B2 | 2/2006 | Li et al. | |
| 7,208,228 B2 | 4/2007 | Brown et al. | |
| 2003/0082385 A1 | 5/2003 | Li et al. | |
| 2003/0124355 A1* | 7/2003 | Li | C08G 59/4021 428/417 |
| 2013/0217283 A1* | 8/2013 | Arai | C08G 59/28 442/59 |

FOREIGN PATENT DOCUMENTS

| | | | | |
|---|---|---|---|---|
| JP | 2009-074009 A | * | 4/2009 | ............... C08J 5/24 |
| JP | 2010-248379 A | * | 11/2010 | ............. C08L 63/00 |
| WO | 2012/064662 A1 | | 5/2012 | |
| WO | 2013/003202 A1 | | 1/2013 | |

OTHER PUBLICATIONS

Machine translation of JP 2009-074009 A (no date).*
Machine translation of JP 2010-248379 A (no date).*
Sun et al. Thermal Rheological Analysis of Cure Process of Epoxy Prepeg. Dissertation, Lousiana State University and Agricultural and Mechanical College, May 2002 [retrieved on Apr. 4, 2014]. Retrieved from the Internet. <URL: http://etd.lsu.edu/docs/available/etd-0412102-135248/unrestricted/Sun_dis.pdf> abstract and pp. 1-79.

* cited by examiner

*Primary Examiner* — Michael J Feely
(74) *Attorney, Agent, or Firm* — Pillsbury Winthrop Shaw Pittman LLP (57) ABSTRACT

An embodiment relates to a resin composition containing a tetraglycidyl amine; a bisphenol epoxy; a dicyandiamide; and an aromatic urea; wherein the tetraglycidyl amine has a EEW of 110 g/eq to 140 g/eq and is an amount of 30 to 60 PHR per 100 PHR of total epoxy resin in the resin composition; wherein the resin composition has a Tg of at least 160° C. when cured at 143° C. for 3 min and also maintains a Tg of greater than 160° C. when cured at 177 C for 1 min or longer.

12 Claims, 2 Drawing Sheets

FIG. 1

C. for 1 min or longer.

EPOXY RESIN COMPOSITION, PREPREG, FIBER REINFORCED PLASTIC MATERIAL, AND MANUFACTURING METHOD FOR FIBER REINFORCED PLASTIC MATERIAL

This application is a U.S. national phase of International Application No. PCT/US2014/010497 filed on Jan. 7, 2014 which is which claims priority to U.S. Provisional Application No. 61/749,703, filed on Jan. 7, 2013, and U.S. Provisional Application No. 61/911,386, filed on Dec. 3, 2013. All of which are incorporated herein by reference in their entireties for all purposes.

INCORPORATION BY REFERENCE

The disclosures of U.S. Provisional Application No. 61/749,703, filed on Jan. 7, 2013, and entitled "Epoxy Resin Composition, Prepreg, Fiber Reinforced Composite Material, and Manufacturing Method for Fiber Reinforced Composite Material" (Inventors: Jonathan C. Hughes, Hiroaki Sakata; and of U.S. Provisional Application No. 61/911,386, filed on Dec. 3, 2013, and entitled "Epoxy Resin Composition, Prepreg, Fiber Reinforced Composite Material, and Manufacturing Method for Fiber Reinforced Composite Material" (Inventors: Jonathan C. Huges and Hiroaki Sakata) are incorporated herein by reference in their entireties for all purposes.

FIELD OF THE INVENTION

The present application provides a rapid curing epoxy resin composition for fiber reinforced plastic materials that can be used with modern fast-cure heating systems without loss of heat resistance, surface quality, or mechanical properties while reducing the residual stress of the cured epoxy matrix composite as well as prepregs and fiber-reinforced plastic materials based thereon as their matrix resins.

BACKGROUND

Fiber Reinforced Plastic (FRP) materials comprising a reinforced fiber and a matrix resin have excellent mechanical properties such as strength and rigidity while being lightweight, and therefore are widely used as aircraft members, spacecraft members, automobile members, railway car members, ship members, sports apparatus members, and computer members such as housings for laptops, and the demand is increasing year by year.

In particular, FRP materials have been recently developed for industrial applications such as automobile members, windmill members and pressure container members. However, the costs of these current materials are too high for these applications due to the high cost of manufacturing and raw materials.

A resin transfer molding method is developed as a low cost manufacturing method. The resin transfer molding method is a method in which a reinforcing fiber base material is directly impregnated with a liquid thermosetting resin composition and cured. Since this method does not involve an intermediate product, such as a prepreg, it has great potential for molding cost reduction. However, FRP materials obtained by this method tend to have low strength and low stiffness due to low fiber content.

The prepreg lamination and molding method can prepare FRP materials having excellent mechanical strength and stiffness. The prepreg lamination and molding method is a method in which a prepreg or prepregs, produced by impregnating a reinforcing fiber base material with a thermosetting resin composition, is formed and laminated, followed by curing of the resin through the application of heat and pressure to the formed and laminated prepreg/prepregs to obtain a fiber-reinforced plastic material.

Patent Documents 1 and 2 disclose matrix resins for the prepreg having a rapid curing property. However, FRP materials obtained from these have insufficient heat resistance for some of the painting processes for the automotive industry. Furthermore, minimum viscosities of these matrix resins are too high and the periods of times to achieve minimum viscosities (gel times) are too short. As the result, the flowability of the resins are insufficient in order to manufacture FRP materials having class A surface without complex cure cycles.

Patent Documents 3 discloses a matrix resin for the prepreg having a high Tg with certain cure cycles. However, because of the long gel times of the resin system the matrix resin will have too much flow from the prepreg, creating dry spots and resin starved areas on the surface of the FRP. This makes will make a FRP material without a class A surface.

PRIOR ART DOCUMENTS

Patent Documents

Patent Document 1 The U.S. Pat. No. 7,005,185 B2
Patent Document 2 The U.S. Publication No. US 2003/82385 A1
Patent Document 3 International Publication WO 2012/064662FRP

SUMMARY

As a result of intensive studies aimed at solving the problems, the inventors have invented a resin composition, also referred to herein as an epoxy resin composition, with the constitutions described below. Namely, an embodiment relates to:

(1) A resin composition comprising:
(a) a tetraglycidyl amine;
(b) a first bisphenol epoxy;
(c) a dicyandiamide; and
(d) an aromatic urea;
wherein the tetraglycidyl amine has an epoxide equivalent weight (EEW) of 110 g/eq to 140 g/eq and is an amount of 30 to 60 PHR per 100 PHR of total epoxy resin in the resin composition;
wherein the cured epoxy resin composition has a Tg of at least 160° C. after heating at 143° C. for 2 3 min and also maintains a Tg of greater than 160° C. when cured at 177° C. for 1 min or longer.
(2) A prepreg comprising the resin composition of item (1).
(3) A fiber reinforced plastic material having a class A surface comprising the prepreg of item (2), wherein the prepreg is cured.

DETAILED DESCRIPTION

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 15° C. to 43° C.

The term "total epoxy resin" refers to all of the epoxy resins present in a resin composition.

An embodiment relates to an epoxy resin composition comprising constituent elements (a) to (d) as mentioned below, wherein the cured epoxy resin composition has a glass transition temperature (Tg) of at least 160° C. after heating at 143° C. for 3 min or 163° C. for 2 min and also maintains a Tg of greater than 160° C. when cured at 177° C. for 1 min or longer:

(a) a tetraglycidyl amine;
(b) a first bisphenol epoxy;
(c) a dicyandiamide; and
(d) an aromatic urea.

In this embodiment, the tetraglycidyl amine has the EEW of 110 g/eq to 140 g/eq, or 110 g/eq to 130 g/eq and is contained by the amount of 30 to 60 PHR or 40 to 60 PHR per 100 PHR of total epoxy resin. If the EEW is at least 100 g/eq, the epoxy resin composition has high storage stability. If the EEW is no more than 140 g/eq, the cured epoxy resin composition has high heat resistance. If the amount is at least 30, the cured epoxy resin composition has high heat resistance. If the amount is no more than 60, the cured epoxy resin composition has high impact resistance.

The high heat resistance means that the Tg of the cured epoxy resin composition is at least 160° C. If the Tg is at least 160° C., for example, the FRP material is hard to transform in a high temperature painting process that is used in the automotive, aerospace and other industries that require long lasting quality coatings.

Examples of the tetraglycidyl amine are tetraglycidyl diaminodiphenylmethane, tetraglycidyl diaminodiphenylether, tetraglycidyl diaminodiphenylsulfone, tetraglycidyl diaminodiphenylamide, tetraglycidyl xylylenediamine and halogen-substituted products, alkynol-substituted products, hydrogenated products thereof and so on. Furthermore, at least one epoxy resin of these epoxy resins can be used.

Examples of commercially available products of tetraglycidyl diaminodiphenyl methane resins include "Sumiepoxy (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY9655, MY720 and MY721 (which are manufactured by Huntsman Advanced Materials).

An example of commercially available product of tetraglycidyl diaminodiphenylsulfone includes TG3DAS (manufactured by Konishi Chemical Ind. Co., Ltd.).

Examples of commercially available products of tetraglycidyl xylylenediamine and hydrogenated products thereof include TETRAD-X and TETRAD-C (which are manufactured by Mitsubishi Gas Chemical Company, Inc.).

In an embodiment, a first bisphenol epoxy is not particularly limited, if it is a material which is an expoxidized bisphenol.

Examples of the first epoxy resin include bisphenol A epoxy resins, bisphenol F epoxy resins, bisphenol S epoxy resins, bisphenol R epoxy resins and halogen-substituted products, alkynol-substituted products, hydrogenated products thereof and so on. Furthermore, at least one epoxy resin of these epoxy resins can be used.

Examples of commercially available products of bisphenol A epoxy resins include "jER (registered trademark)" 825, 828, 834, 1001, 1002, 1003, 1003F, 1004, 1004AF, 1005F, 1006FS, 1007, 1009 and 1010 (which are manufactured by Mitsubishi Chemical Corporation), "Epon (registered trademark)" 825, 826, 827, 828, 830, 1001F, 1002F, 1004F, 1007F, 1009F, 2002, 2003, 2004, 2005, 2014, 2024, 2041, and 3002 (which are manufactured by Momentive Specialty Chemicals Inc.). Examples of commercially available products of the brominated bisphenol A epoxy resin include "jER (registered trademark)" 505, 5050, 5051, 5054 and 5057 (which are manufactured by Mitsubishi Chemical Corporation). Examples of commercially available products of the hydrogenated bisphenol A epoxy resin include ST5080, ST4000D, ST4100D and ST5100 (which are manufactured by Nippon Steel Chemical Co., Ltd.).

Examples of commercially available products of bisphenol F epoxy resins include "jER (registered trademark)" 806, 807, 4002P, 4004P, 4007P, 4009P and 4010P (which are manufactured by Mitsubishi Chemical Corporation), and "Epotohto (registered trademark)" YDF2001 and YDF2004 (which are manufactured by Nippon Steel Chemical Co., Ltd.). An example of a commercially available product of the tetramethyl-bisphenol F epoxy resin is YSLV-80XY (manufactured by Nippon Steel Chemical Co., Ltd.).

An Example of commercially available product of a bisphenol S epoxy resins includes "Epiclon (registered trademark)" EXA-154 (manufactured by DIC Corporation).

In some of the embodiments, the first bisphenol epoxy may have the EEW of 500 g/eq to 1500 g/eq and may be contained by the amount of 10 to 40 PHR, and between 10 to 25 PHR in other embodiments per 100 PHR of total epoxy resin. If the EEW is at least 500 g/eq, the cured epoxy resin composition may have high elongation property and high impact resistance. If the EEW is no more than 1500 g/eq, the cured epoxy resin composition may have high heat resistance.

In other embodiments, the first bisphenol epoxy, which has the EEW of 500 g/eq to 1500 g/eq, may be the bisphenol epoxy having EEW of 500 g/eq to 1500 g/eq by itself and may be the combination of more than two bisphenol epoxies which have each EEW of more than 500 and have the average EEW of 500 g/eq to 1500 g/eq. The method of average EEW calculation is described below. For example that Wx PHR of epoxy of Ex (g/eq), Wy PHR of epoxy of Ey (g/eq) and Wz PHR of epoxy of Ez (g/eq) are combined, the average EEW can be calculated by the equation described below.

$$\text{The average } EEW = (Wx+Wy+Wz)/(Wx/Ex+Wy/Ey+Wz/Ez)$$

Wherein W is equal to the weight percent of each epoxy and E refers to the EEW of the corresponding epoxy.

Furthermore, the first bisphenol, which has the EEW of 500 g/eq to 1500 g/eq and is contained by the amount of 10 to 40 PHR or alternatively 10 to 25 PHR per 100 PHR of total epoxy resin, may use with a second bisphenol epoxy having an EEW of 150 to 200. If the second bisphenol epoxy is contained in the epoxy composition the composition will be easier to impregnate into fibers to obtain the fiber reinforced plastic having a high strength.

Furthermore, if the second bisphenol epoxy is contained in the epoxy resin composition, the first bisphenol epoxy may be compatible with the tetraglycidyl amine and/or a thermoplastic and may obtain a cured epoxy resin composition having high heat resistance along with the fiber FRP material having high heat resistance. Furthermore, at least one epoxy resin having the EEW of 150 to 200 can be used as the second bisphenol epoxy.

In some embodiments, the first bisphenol epoxy may have the EEW of 500 g/eq to 1000 g/eq or 500 g/eq to 750 g/eq and may be contained by the amount of 10 to 40 PHR per 100 PHR of total epoxy resin. If the first bisphenol epoxy is used, the first bisphenol epoxy may be compatible with the tetraglycidyl amine and/or a thermoplastic and may obtain a cured epoxy resin composition having high heat resistance and a FRP material having high heat resistance.

In some other embodiments, the first bisphenol epoxy, which has the EEW of 500 g/eq to 1000 g/eq, may be the bisphenol epoxy having EEW of 500 g/eq to 1000 g/eq by itself or may be the combination of more than two bisphenol epoxies which have each an EEW of 500 or more and have the average EEW of 500 g/eq to 1000 g/eq. The method of average EEW calculation is the same as mentioned above.

In the embodiments herein, any epoxy resin other than the tetraglycidyl amine, the first bisphenol epoxy and the second bisphenol epoxy may be added. Examples of the epoxy resin include diglycidyl amines, triglycidyl amines, phenol-novolac epoxy resins, cresol-novolac epoxy resins, resorcinol epoxy resins, naphthalene epoxy resins, dicyclopentadiene epoxy resins, epoxy resins having a biphenyl skeleton, isocyanate-modified epoxy resins, alicyclic epoxy resins, aliphatic epoxy resins and halogen-substituted products, alkynol-substituted products, hydrogenated products thereof and so on. Furthermore, at least one epoxy resin of these epoxy resins may be used.

Examples of commercially available products of diglycidyl amines include GAN and GOT (which are manufactured by Nippon Kayaku Co., Ltd.)

Examples of commercially available products of triglycidyl amines include "Sumiepoxy (registered trademark)" ELM100 (manufactured by Sumitomo Chemical Co., Ltd.), "Araldite (registered trademark)" MY0500, MY0510 and MY0600 (which are manufactured by Huntsman Advanced Materials) and "jER (registered trademark)" 630 (manufactured by Mitsubishi Chemical Corporation).

Examples of commercially available products of phenol-novolac epoxy resins include "jER (registered trademark)" 152 and 154 (which are manufactured by Mitsubishi Chemical Corporation), "Epiclon (registered trademark)" N-740, N-770 and N-775 (which are manufactured by DIC Corporation), and "Araldite (registered trademark)" EPN1138 (Huntsman Specialty Chemicals)

Examples of commercially available products of cresol-novolac epoxy resins include "Epiclon (registered trademark)" N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a commercially available product of a resorcinol epoxy resin is "Denacol (registered trademark)" EX-201 (manufactured by Nagase chemteX Corporation).

Examples of commercially available products of naphthalene epoxy resins include HP-4032, HP4032D, HP-4700, HP-4710, HP-4770, EXA-4701, EXA-4750, EXA-7240 (which are manufactured by DIC Corporation)

Examples of commercially available products of dicyclopentadiene epoxy resins include "Epiclon (registered trademark)" HP7200, HP7200L, HP7200H and HP7200HH (which are manufactured by DIC Corporation), "Tactix (registered trademark)" 558 (manufactured by Huntsman Advanced Material), and XD-1000-1L and XD-1000-2L (which are manufactured by Nippon Kayaku Co., Ltd.).

Examples of commercially available products of epoxy resins having a biphenyl skeleton include "jER (registered trademark)" YX4000H, YX4000 and YL6616 (which are manufactured by Mitsubishi Chemical Corporation), and NC-3000 (manufactured by Nippon Kayaku Co., Ltd.).

Examples of commercially available products of isocyanate-modified epoxy resins include AER4152 (manufactured by Asahi Kasei Epoxy Co., Ltd.) and ACR1348 (manufactured by ADEKA Corporation) each of which has an oxazolidone ring.

Examples of commercially available products of aliphatic epoxy resins s include "Denacol (registered trademark)" EX-111, 121, 141, 145, 146, 147, 171, 192, 201, 211, 212, 252, 313, 314, 321, 411, 421, 512, 521, 611, 612, 614, 614B, 622, 810, 811, 821, 830, 832, 841, 850, 851, 861, 911, 920, 931 and 941 (which are manufactured by Nagase chemteX Corporation)

In some of the embodiments herein, dicyandiamide is used as a curing agent. If the dicyandiamide is used as a curing agent, the epoxy resin composition has high storage stability and the cured epoxy resin composition has high heat resistance.

The amount of the dicyandiamide may be in range of 3 to 7 PHR per 100 PHR of total epoxy resin. If the amount of the dicyandiamide is at least 3 PHR, the cured epoxy resin composition may have high heat resistance. If the amount of the dicyandiamide is no more than 7 PHR, the cured epoxy resin composition may have high elongation.

Examples of commercially available product of the dicyandiamide include DICY-7 and DICY-15 (which are manufactured by Mitsubishi Chemical Corporation) and "Dyhard (registered trademark)" 100S (manufactured by AlzChem Trostberg GmbH). In other embodiments herein, any curing agent other than the dicyandiamide may be added.

Examples of the curing agent include polyamides, amidoamines (e.g., aromatic amidoamines such as aminobenzamides, aminobenzanilides, and aminobenzenesulfonamides), aromatic diamines (e.g., diaminodiphenylmethane, diaminodiphenylsulfone [DDS]), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines such as tetramethylguanidine, carboxylic acid anhydrides (e.g., methylhexahydrophthalic anhydride), carboxylic acid hydrazides (e.g., adipic acid hydrazide), phenol-novolac resins and cresol-novolac resins, carboxylic acid amides, polyphenol compounds, polysulfides and mercaptans, and Lewis acids and bases (e.g., boron trifluoride ethylamine, tris-(diethylaminomethyl) phenol). Furthermore, at least one curing agent of these curing agents may be used.

In some embodiments herein, the aromatic urea is used as an accelerator for a reaction of an epoxy resin with a curing agent and/or self-polymerization of epoxy resin. If the aromatic amine is used as an accelerator, the epoxy resin composition has high storage stability and the cured epoxy resin composition has high heat resistance.

The amount of the aromatic urea may be in range of 0.5 to 7 PHR per 100 PHR of total epoxy resin. If the amount of the aromatic urea is at least 0.5 PHR, the cured epoxy resin composition may have high heat resistance. If the amount of the aromatic urea is no more than 7 PHR, the epoxy resin composition has high storage stability.

Examples of the aromatic urea include N, N-dimethyl-N'-(3,4-dichlorophenyl) urea, toluene bis (dimethylurea), 4,4'-methylene bis (phenyl dimethylurea), and 3-phenyl-1, 1-dimethylurea. Examples of commercially available product of the aromatic urea include DCMU99 (manufactured by Hodogaya Chemical Co., Ltd.), and "Omicure (registered trademark)" 24,24M, 52 and 94 (which are manufactured by CVC Thermoset Specialties). Among these, aromatic ureas having more than one urea group may be used in viewpoint of rapid curing properties In other embodiments herein, any accelerator other than the aromatic urea may be added.

Examples of the accelerators include sulfonate compounds, boron trifluoride piperidine, p-t-butylcatechol, sulfonate compounds (e.g., ethyl p-toluenesulfonate or methyl p-toluenesulfonate), a tertiary amine or a salt thereof, an imidazole or a salt thereof, phosphorus curing accelerators, metal carboxylates and a Lewis or Bronsted acid or a salt thereof.

Examples of commercially available product of an imidazole compound or derivatives thereof include 2MZ, 2PZ and 2E4MZ (which are manufactured by Shikoku Chemicals Corporation). Examples of a Lewis acid catalyst include complexes of a boron trihalide and a base, such as a boron trifluoride piperidine complex, boron trifluoride monoethyl amine complex, boron trifluoride triethanol amine complex, boron trichloride octyl amine complex, methyl p-toluenesulfonate, ethyl p-toluenesulfonate and isopropyl p-toluenesulfonate.

For the embodiments herein, any thermoplastic resin may be added. Examples of the thermoplastic resin include a thermoplastic resin that is soluble in an epoxy resin and organic particles such as rubber particles and thermoplastic resin particles. As the thermoplastic resin that is soluble in an epoxy resin, a thermoplastic resin having a hydrogen-binding functional group which is expected to have an effect of improving the adhesion between a resin and a reinforcing fiber may be used. Examples of the thermoplastic resin which is soluble in an epoxy resin and has a hydrogen-binding functional group include a thermoplastic resin having an alcoholic hydroxy group, a thermoplastic resin having an amide bond, and a thermoplastic resin having a sulfonyl group.

Examples of the thermoplastic resin having a hydroxyl group include a polyvinyl acetal resin such as polyvinyl formal and polyvinyl butyral, a polyvinyl alcohol and a phenoxy resin. Examples of the thermoplastic resin having an amide bond include polyamide, polyimide and polyvinyl pyrrolidone. An example of the thermoplastic resin having a sulfonyl group is polysulfone. The polyamide, the polyimide and the polysulfone may have a functional group such as an ether bond and a carbonyl group in the main chain thereof. The polyamide may have a substituent on a nitrogen atom in the amide group.

Examples of commercially available products of the thermoplastic resin soluble in an epoxy resin and having a hydrogen-binding functional group include: "Denkabutyral (registered trademarks)" and "Denkaformal (registered trademarks)" (which are manufactured by Denki Kagaku Kogyo Kabushiki Kaisha) and "Vinylec (registered trademark)" (manufactured by JNC Corporation) which are polyvinyl acetal resins; "UCAR (registered trademark)" PKHP (manufactured by Union Carbide Corporation) which is a phenoxy resin; "Macromelt (registered trademark)" (manufactured by Henkel-Hakusui Corporation) and "Amilan (registered trademark)" CM4000 (manufactured by Toray Industries Inc.) which are polyamide resins; "Ultem (registered trademark)" (manufactured by General Electric Co., Ltd.) and "Matrimid (registered trademark)" 5218 (manufactured by Ciba Inc.) which are polyimides; "Sumikaexcel (registered trademark)" (manufactured by Sumitomo Chemical Co., Ltd.) and "UDEL (registered trademark)" (manufactured by Solvay Advanced Polymers Kabushiki Kaisha) which are polysulfones; and "Luviskol (registered trademark)" (manufactured by BASF Japan Ltd.) which is polyvinyl pyrrolidone.

The acrylic resin has high incompatibility with an epoxy resin, and therefore may be used suitably for controlling viscoelasticity. Examples of commercially available products of the acrylic resin include "Diana) (registered trademark)" BR series (manufactured by Mitsubishi Rayon Co., Ltd.), "Matsumoto Microsphere (registered trademark)" M, M100 and M500 (which are manufactured by Matsumoto Yushi-Seiyaku Co., Ltd.), and "Nanostrength (registered trademark)" E40F, M22N and M52N (which are manufactured by Arkema).

Rubber particles may be also added. As for the rubber particles, crosslinked rubber particles and core-shell rubber particles produced by the graft polymerization of different polymers on the surfaces of crosslinked rubber particles may be used, from the viewpoint of handling properties.

Examples of commercially available products of the crosslinked rubber particles include FX501P (manufactured by Japan Synthetic Rubber Corporation) which comprises a crosslinked product of a carboxyl-modified butadiene-acrylonitrile copolymer, and CX-MN series (manufactured by Nippon Shokubai Co., Ltd.) and YR-500 series (manufactured by Nippon Steel Chemical Co., Ltd.) each of which comprises acrylic rubber microparticles.

Examples of commercially available products of the core-shell rubber particles include "Paraloid (registered trademark)" EXL-2655 (manufactured by Kureha Corporation) which comprises a butadiene-alkyl methacrylate-styrene copolymer, "Staphyloid (registered trademark)" AC-3355 and TR-2122 (which are manufactured by Takeda Pharmaceutical Co., Ltd.) each of which comprises an acrylic acid ester-methacrylic acid ester copolymer, "PARALOID (registered trademark)" EXL-2611 and EXL-3387 (which are manufactured by Rohm & Haas) each of which comprises a butyl acrylate-methyl methacrylate copolymer, and "Kane Ace (registered trademark)" MX series (manufactured by Kaneka Corporation).

As for the thermoplastic resin particles, polyamide particles and polyimide particles may be used. Examples of commercially available products of the polyamide particles include SP-500 (manufactured by Toray Industries Inc.) and "Orgasol (registered trademark)" (manufactured by Arkema).

For the embodiments herein, any inorganic particle may be added. Examples of the inorganic particle include metallic oxide particles, metallic particles and mineral particles. Furthermore, at least one inorganic particle of these inorganic particles can be used. The inorganic particle may be used to improve some functions of the cured epoxy resin composition and to impart some functions to the cured epoxy resin composition. Examples of the function include surface hardness, anti-blocking property, heat resistance, barrier property, conductivity, antistatic property, electromagnetic wave absorption, UV shield, toughness, impact resistance, low coefficient of linear thermal expansion.

Examples of the metallic oxide include silicon oxide, titanium oxide, zirconium oxide, zinc oxide, tin oxide, indium oxide, aluminum oxide, antimony oxide, cerium oxide, magnesium oxide, iron oxide, tin-doped indium oxide (ITO), antimony-doped tin oxide and fluorine-doped tin oxide.

Examples of the metal include gold, silver, copper, aluminum, nickel, iron, zinc and stainless. Examples of the mineral include montmorillonite, talc, mica, boehmite, kaoline, smectite, xonotlite, vermiculite and sericite.

Examples of other inorganic material include carbon black, acetylene black, Ketjen black, carbon nanotube, graphene, aluminum hydroxide, magnesium hydroxide, glass bead, glass flake and glass balloon.

Any size of the inorganic particle, for example which is in range of 1 nm to 10 µm, may be used and any shape of the inorganic particle, for example which is spherical, needle, plate, balloon or hollow, may be used. The inorganic particle may be just used as powder and used as dispersion in a solvent like sol or colloid.

Furthermore, the surface of the inorganic particle may be treated by a coupling agent to improve the dispersibility and the interfacial affinity with the epoxy resin.

For the embodiments herein, the epoxy resin composition may contain any other materials except the materials mentioned above. Examples of other materials include mold release agent, surface treatment, flame retardant, antibacterial, leveling agent, antifoaming agent, thixotropic agent, heat stabilizer, light stabilizer, UV absorber, pigment, coupling agent and metal alkoxide.

In this embodiment, the cured epoxy resin composition has a Tg of at least 160° C. after heating at 143° C. for 3 min. This Tg is also maintained or greater when cured at 177° C. for 1 min or longer unlike some of the comparative examples that lose Tg with increased cure temperatures. Furthermore, the cure degree of the epoxy resin composition may be no less than 70% if the Tg of the cured epoxy resin composition heated at 143° C. for 3 min is at least 160° C., for example, the FRP material is hard to transform in a high temperature painting process that is used in the automotive, aerospace and other industries that require long lasting quality coatings.

The Tg of the cured epoxy resin composition compositions of this specification are measured by the method described below. A specimen measuring 10 mm in width and 60 mm in length is cut from a cured epoxy resin composition plate. The specimen is then subjected to the measurement of a Tg in 1.0 Hz torsion mode using a dynamic viscoelasticity measuring device (ARES, manufactured by TA Instruments) by heating it to temperatures of 50° C. to 250° C. at a rate of 5° C./min in accordance with SACMA SRM 18R-94. The glass transition temperature was determined by finding the intersection between the tangent line of the glass region and the tangent line of the transition region from the glass region to the rubber region on the temperature-storage elasticity modulus curve, and the temperature at that intersection was considered to be the glass transition temperature also called the G' Tg.

Embodiments of the cured epoxy resin composition may have one or more viscous modulus (G") peaks. The height of each peak is calculated by subtracting the peak height in MPa by the corresponding valley that precedes the peek. If the height of anyone of these peaks is less than 15 MPa, then the corresponding transition on the G' curve is not used to calculate the Tg.

The cured epoxy resin composition heated at 143° C. for 3 min is molded by the method described below. After de-foaming under vacuum and high shear mixing, the epoxy resin composition is injected into a mold set for a thickness of 2 mm using a 2 mm-thick Teflon (registered trademark) spacer. Then, the temperature raises at a rate of 50° C./minute from room temperature to 143° C. and held for 3 minutes at 143° C. to obtain a 2 mm-thick plate-shaped cured epoxy resin composition.

The cured epoxy resin composition heated at 177° C. for 1 min is molded by the same method described above.

For the embodiments of the epoxy resin composition, the cure degree of the cured epoxy resin composition is determined by the following method. The calorific value of the uncured epoxy resin composition ($H_0$) is measured by heating from room temperature to 250° C. at a temperature rise rate of 10° C./min. using a differential scanning calorimetric measurement device (DSC) (Q2000: manufactured by TA Instruments Inc.) The calorific value of the corresponding cured epoxy resin composition ($H_1$) is measured by the same method as the cured epoxy resin composition. Then, the cure degree of the cured epoxy resin composition is calculated the equation described below.

$$\text{The cure degree } (\%) = [(H_0 - H_1) \times 100 / H_0]$$

Figure 2:
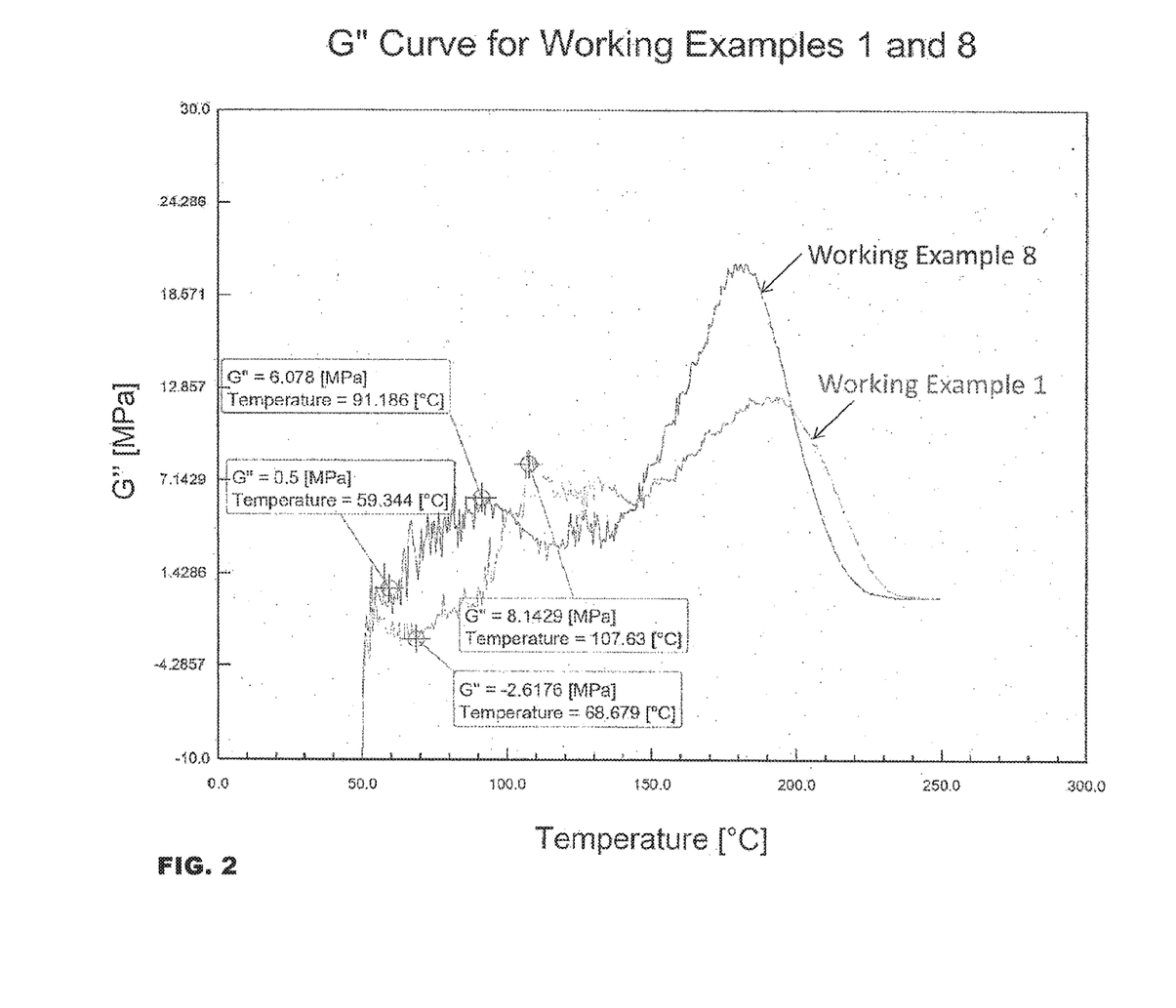
FIG. 2 shows viscous modulus of the epoxy resin composition of working example 1 and 8

The difference value between the maximum G" value and the minimum G" value, as shown in FIG. 2, of the cured epoxy resin composition in range from 55° C. to 140° C. may be no more than 15 MPa. The G" value is measured by the same method as the cured epoxy resin composition Tg measurement method. If the difference value is no more than 15 MPa, the Tg of the FRP material made with the epoxy resin composition will have a Tg close to that of the cured epoxy resin composition and have high heat resistance.

The Tg of the FRP material is measured by the same method as the cured epoxy resin composition Tg measurement method using FRP materials having the thickness of almost 0.6 mm.

When the epoxy resin composition is used as the matrix resin of a prepreg, the viscosity at 80° C. may be 0.5 to 200 Pa·s and in other embodiments from 5 to 50 Pa·s from the viewpoint of processability, including tackiness and drapability.

When the epoxy resin composition is used as the matrix resin of a prepreg, a minimum viscosity of the epoxy resin composition may be no more than 50 mPa·s in viewpoint of a class A surface of the FRP material. Furthermore, A period of a time reaching the minimum viscosity of the epoxy resin composition, should be at least 36 min in the viewpoint of a class A surface of the FRP material.

The term "viscosity" refers to the complex viscoelastic modulus η* as measured at a frequency of 0.5 Hz and a gap length of 1 mm using a dynamic viscoelastic measuring device (ARES, manufactured by TA Instruments) and circular parallel plates 40 mm in diameter as the temperature is monotonically increased at a rate of 2° C./min.

When the epoxy resin composition is used as the matrix resin of a prepreg, a period of time reaching gel point (gel time) of the epoxy resin composition may be no more than 4 minutes. In the viewpoint of a class A surface of the FRP material. The gel time is measured by the method in according to JIS K-7071 and the temperature is monotonically increased at a rate of 50° C./min.

If the minimum viscosity is no more than 50 mPa·s and the period of the time reaching the minimum viscosity is at least 36 min, the epoxy resin composition may wet out the molding tool surface. Furthermore, if the gel time is no more than 4 minute when heated at a rate of 50° C./min or more, the epoxy resin composition is prevented from excessively flowing out of the FRP material and creating resin starved areas onto the surface of the FRP material. As these results, the epoxy resin composition should provide the cured FRP material having a class A surface.

It may be that embodiments of the cured epoxy resin composition produce a cured epoxy resin composition with a modulus of 2.5 to 5.0 GPa. If the modulus is at least 2.5, the FRP material may have high strength. If the modulus is no more than 5.0, the FRP material may have high impact resistance.

It may be that embodiments of the cured epoxy resin composition have a resin toughness ($K_{Ic}$) of at least 0.6 MPa·m$^{0.5}$, and in other embodiments at least 0.8 MPa·m$^{0.5}$. If the resin toughness is at least 0.6 MPa·m$^{0.5}$, the FRP material may have high impact resistance.

In the preparation of the embodiments of the epoxy resin composition herein, a kneader, planetary mixer, triple roll mill, twin screw extruder, and the like may advantageously be used. After the epoxy resins are placed, the mixture is heated to a temperature selected from 130 to 180° C. while being stirred so as to uniformly dissolve the epoxy resins. During this process, other components excluding the curing agent and curing accelerator (e.g. thermoplastic, inorganic particle) may be added to the epoxy resins and kneaded with them. After this, the mixture is cooled down to a temperature of no more than 100° C. in some embodiments, no more than 80° C. in other embodiments or no more than 60° C. in still other embodiments, while being stirred, followed by the addition of the curing agent and curing accelerator and kneading to disperse those components. This method may be used as it provides an epoxy resin composition with excellent storage stability.

Next, FRP materials are described. By curing embodiments of the epoxy resin composition after impregnating reinforcing fibers with it, a FRP material that contains, as its matrix resin, embodiments of the epoxy resin composition in the form of a cured product may be obtained.

There are no specific limitations or restrictions on the type of reinforcing fiber used, and a wide range of fibers, including glass fiber, carbon fiber, graphite fiber, aramid fiber, boron fiber, alumina fiber and silicon carbide fiber, are used. At least one reinforced fiber of these reinforcing fibers may be mixed and put to use. Carbon fiber may provide FRP materials that are particularly lightweight and stiff. Of all carbon fibers, those with a tensile modulus of 230 to 800 GPa may be used. If a carbon fiber with a high modulus of 230 to 800 GPa is combined with an epoxy resin composition in viewpoint of the balance of the stiffness, strength and impact resistance of the FRP material.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable for applications where a high specific strength and specific modulus are required.

FRP materials may be manufactured using methods such as the prepreg lamination and molding method, resin transfer molding method, resin film infusion method, hand lay-up method, sheet molding compound method, filament winding method and pultrusion method, though no specific limitations or restrictions apply in this respect.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The prepreg lamination and molding method is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain a FRP material.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by a squeeze die and heating die for molding and curing, by continuously drawing them using a tensile machine. Since this method offers the advantage of continuously molding FRP materials, it is used for the manufacture of FRP materials for fishing rods, rods, pipes, sheets, antennas, architectural structures, and so on.

Of these methods, the prepreg lamination and molding method may be used to give excellent stiffness and strength to the FRP materials obtained.

Prepregs may contain embodiments of the epoxy resin composition and reinforcing fibers. Such prepregs may be obtained by impregnating a reinforcing fiber base material with an epoxy resin composition disclosed herein. Impregnation methods include the wet method and hot melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition. The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method may give the prepreg having virtually no residual solvent in it.

The reinforcing fiber cross-sectional density of a prepreg may be 50 to 200 g/m$^2$. If the cross-sectional density is at least 50 g/m$^2$, there may be a need to laminate a small number of prepregs to secure the predetermined thickness when molding a FRP material and this may simplify lamination work. If, on the other hand, the cross-sectional density is no more than 200 g/m$^2$, the drapability of the prepreg may be good. The reinforcing fiber mass fraction of a prepreg may be 60 to 90 mass % in some embodiments, 65 to 85 mass % in other embodiments or even 70 to 80 mass % in still other embodiments. If the reinforcing fiber mass fraction is at least 60 mass %, there is sufficient fiber content, and this may provide the advantage of a FRP material in terms of its excellent specific strength and specific modulus, as well as preventing the FRP material to generate too much heat during the curing time. If the reinforcing fiber mass fraction is no more than 90 mass %, impregnation with the resin may be satisfactory, decreasing a risk of a large number of voids forming in the FRP material.

To apply heat and pressure under the prepreg lamination and molding method, the press molding method, autoclave molding method, bagging molding method, wrapping tape method, internal pressure molding method, or the like may be used as appropriate.

The autoclave molding method is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 200° C. range.

The wrapping tape method is a method in which prepregs are wrapped around a mandrel or some other cored bar to form a tubular FRP material. This method may be used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 78 N. The molding temperature may be in the 80 to 200° C. range.

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 200° C. or in the 80 to 180° C. range.

The FRP material produced from the prepreg may have a class A surface as mentioned above. The class A surface means the surface that exhibit extremely high finish quality characteristics free of aesthetic blemishes and defects.

FRP materials that contain cured epoxy resin compositions obtained from epoxy resin compositions and reinforcing fibers are advantageously used in sports applications, general industrial applications, and aeronautic and space applications. Concrete sports applications in which these materials are advantageously used include golf shafts, fishing rods, tennis or badminton rackets, hockey sticks and ski poles. Concrete general industrial applications in which these materials are advantageously used include structural materials for vehicles, such as automobiles, bicycles, marine vessels and rail vehicles, drive shafts, leaf springs, windmill blades, pressure vessels, flywheels, papermaking rollers, roofing materials, cables, and repair/reinforcement materials.

Tubular FRP materials produced by curing prepregs into tubular shape are advantageously used for golf shafts, fishing rods, and the like.

EXAMPLES

The present embodiments are now described in more detail by way of examples. The measurement of various properties was carried out using the methods described below. Those properties were, unless otherwise noted, measured under environmental conditions comprising a temperature of 23° C. and a relative humidity of 50%. The components used in examples and comparative examples are as follows.

<Epoxy Resin>
Tetraglycidyl diaminodiphenylmethane, Araldite (registered trademark) MY9655 having an EEW of 126 g/eq (manufactured by Huntsman Advanced Materials)
Bisphenol A epoxy resin, "Epon (registered trademark)" 1001F having an EEW of 480 g/eq (manufactured by Momentive Specialty Chemicals)
Bisphenol A epoxy resin, "Epon (registered trademark)" 3002 having an EEW of 555 g/eq (manufactured by Momentive Specialty Chemicals)
Bisphenol A epoxy resin, "Epon (registered trademark)" 2014 having EEW of 800 g/eq (manufactured by Momentive Specialty Chemicals)
Bisphenol A epoxy resin, "Epon (registered trademark)" 2024 having an EEW of 900 g/eq (manufactured by Momentive Specialty Chemicals)
Bisphenol A epoxy resin, "Epon (registered trademark)" 2005 having an EEW of 1300 g/eq (manufactured by Momentive Specialty Chemicals)
Bisphenol A epoxy resin, "Epon (registered trademark)" 828 having an EEW of 187 g/eq (manufactured by Momentive Specialty Chemicals)
Phenol novolac epoxy resin, "Aralidite EPN (registered trademark)" 1138 having an EEW of 178 g/eq (manufactured by Huntsman Advanced Materials)
<Hardener>
Dicyandiamide, "Dyhard (registered trademark)" 1005 (manufactured by AlzChem Trostberg GmbH)
4,4'-Diaminodiphenylsulfone (DDS), (manufactured by Wakayama Seika Kogyo Co., Ltd.)
<Accelerator>
2,4'-Toluene bis dimethyl urea, "Omicure (registered trademark)" U-24M (manufactured by CVC Thermoset Specialties)
<Thermoplastic Resin>
Poly Vinyl Formal, "Vinylec (registered trademark)" PVF-K (manufactured by JNC Corporation)
<Carbon Fibers>
"Carbon fiber, "Torayca (registered trademark)" T700G-24K-31E having a fiber filament count of 24,000, tensile strength of 4.9 GPa, tensile elasticity of 240 GPa, and tensile elongation of 2.0% (manufactured by Toray Industries Inc.)

The following measurement methods were used to measure the epoxy resin composition, the prepreg and the FRP material for each working example.

(1) Epoxy Resin Viscosity
A mixture was created by dissolving prescribed amounts of all the components other than the curing agent and curing accelerator in a mixer, and then prescribed amounts of the curing agent were mixed into the mixture along with prescribed amounts of the accelerator to obtain the epoxy resin composition.

The epoxy resin composition was measured using a dynamic viscoelasticity measuring device (ARES, manufactured by TA Instruments) using parallel plates while simply increasing the temperature at a rate of 2° C./min, with a strain of 100%, frequency of 0.5 Hz, and plate interval of 1 mm, from 50° C. to 170° C.

(2) Glass Transition Temperature of Cured Epoxy Resin Composition

The cured epoxy resin composition is molded by the method described below. After deforming under vacuum and high shear mixing, the epoxy resin composition prepared in (1) is injected into a mold set for a thickness of 2 mm using a 2 mm-thick "Teflon (registered trademark)" spacer. Then, the epoxy resin composition was cured in the conditions described below to obtain a 2 mm-thick plate-shaped cured resin composition.

Condition 1: The epoxy resin composition was heated at a rate of 50° C./min from room temperature to 143° C. and then kept for 3 minutes at 143° C.

Condition 2: The epoxy resin composition was heated at a rate of 50° C./min from room temperature to 163° C. and then kept for 2 minutes at 163° C.

Condition 3: The epoxy resin composition was heated at a rate of 50° C./min from room temperature to 177° C. and then kept for 2 minutes at 177° C.

The specimen is then subjected to the measurement of a Tg in 1.0 Hz torsion mode using a dynamic viscoelasticity measuring device (ARES, manufactured by TA Instruments) by heating it to temperatures of 50° C. to 250° C. at a rate of 5° C./min in accordance with SACMA SRM 18R-94.

Tg was determined by finding the intersection between the tangent line of the glass region and the tangent line of the transition region from the glass region to the rubber region on the temperature-storage elasticity modulus curve, and the temperature at that intersection was considered to be the glass transition temperature also called the G' Tg.

However, when the cured resin composition has one or more viscous modulus (G") peaks, Tg was determined by the following method. The height of each peak is calculated by subtracting the peak height in MPa by the corresponding valley that precedes the peek. If the height of anyone of these peaks is over 15 MPa, then the corresponding transition on the G' curve is used to calculate the Tg.

(3) Cure Degree of Cured Epoxy Resin Composition

The calorific value of the uncured epoxy resin composition ($H_0$) was measured by heating from room temperature to 250° C. at a temperature rise rate of 10° C./min. using a differential scanning calorimetric measurement device (DSC) (Q2000: manufactured by TA Instruments Inc.) The calorific value of the corresponding cured epoxy resin composition ($H_1$) was measured by the same method as the cured epoxy resin composition. Then, the cure degree of the cured epoxy resin composition was calculated the equation described below.

$$\text{The cure degree (\%)}=[(H_0-H_1)\times 100/H_0]$$

(4) Gel Properties of Epoxy Resin Composition

The gel time and gel temperature of the epoxy resin composition prepared in (1) was determined using ASTM D3532/R2004 or JIS K-7071 "Test Method of Prepreg Made of Carbon Fiber and Epoxy Resin". The cure cycles used to determine the gel time and gel temperature are the same described in (2).

(5) Toughness of Cured Epoxy Resin Composition

A specimen measuring 12.7 mm×150 mm was cut from the cured epoxy resin composition obtained in (2). Then, the specimen was processed and tested using an Instron universal testing machine (made by Instron) in accordance with ASTM D5045 (1999). The introduction of an initial crack into the specimen was performed by placing a razor blade, cooled down to liquid nitrogen temperature, against the specimen and striking the back of the blade with a hammer to apply an impact force. Here, resin toughness refers to critical stress in deformation mode I (open mode). There were five specimens, and the average measurement (n=5) was adopted as the resin toughness value.

(6) Glass Transition Temperature of FRP Material

The epoxy resin composition prepared in (1) was applied onto release paper using a knife coater to produce two sheets of 52.0 g/m² resin film. Next, the aforementioned 2 sheets of fabricated resin film were overlaid on both sides of unidirectionally oriented carbon fibers with a density of 1.8 g/cm² in the form of a sheet (T700G-24K-31E) and the epoxy resin composition was impregnated using a roller temperature of 100° C. and a roller pressure of 0.07 MPa to produce a unidirectional prepreg with a carbon fiber area weight of 190 g/m² and an epoxy resin composition weight fraction of 35.4%.

Three plies of the unidirectional prepregs were laminated in a uniform fiber orientation. The laminated prepregs were covered with nylon film without any gaps and heated under pressure of 1 MPa at a rate of 50° C./min from room temperature to 143° C. in a press and then kept for 3 minutes at 143° C. to obtain the 0.6 mm thick FRP plate.

The measurement method of FPR plate Tg was the same as (2) except using 0.6 mm thick FRP plate.

(7) Surface Quality of FRP Material

The surface quality of the FPR material in prepared in (6) was evaluated by the following method. An alignment disorder of the reinforced fiber, a defective portion of the cured epoxy resin composition and a void on the FRP material surface were observed visually. A surface without these defects is a high-quality surface. On the other hand, a surface with at least one in these defects is a defective surface.

Working Examples 1-15 and Comparative Examples 1-6

The various amounts for each example are stated in table 1 to 3. The epoxy resin compositions shown in table 1 to 3 were produced in accordance with the method described in (1).

The produced epoxy resin composition was cured by the methods described in (2). The results for each test are stated in table 1 to 3.

The FRP material was molded by the method described in (6). The results for each test are stated in table 1 and 3.

Examples 1 to 15 provide good results.

The cured epoxy resin composition of example 1 has a higher Tg than that of example 13 when cured using condition 1. On the other hand, the FPC material of example 1 has the lower Tg than that of example 13 when cured using condition 1, because the EEW of the first bisphenol epoxy of example 1 is over 1000 and the EEW of that of example 13 is from 500 to 1000.

The cured epoxy resin composition of example 1 has a higher toughness than that of example 10 since the average EEW of the first bisphenol epoxy in example 1 is from 500 to 1500.

Figure 1:
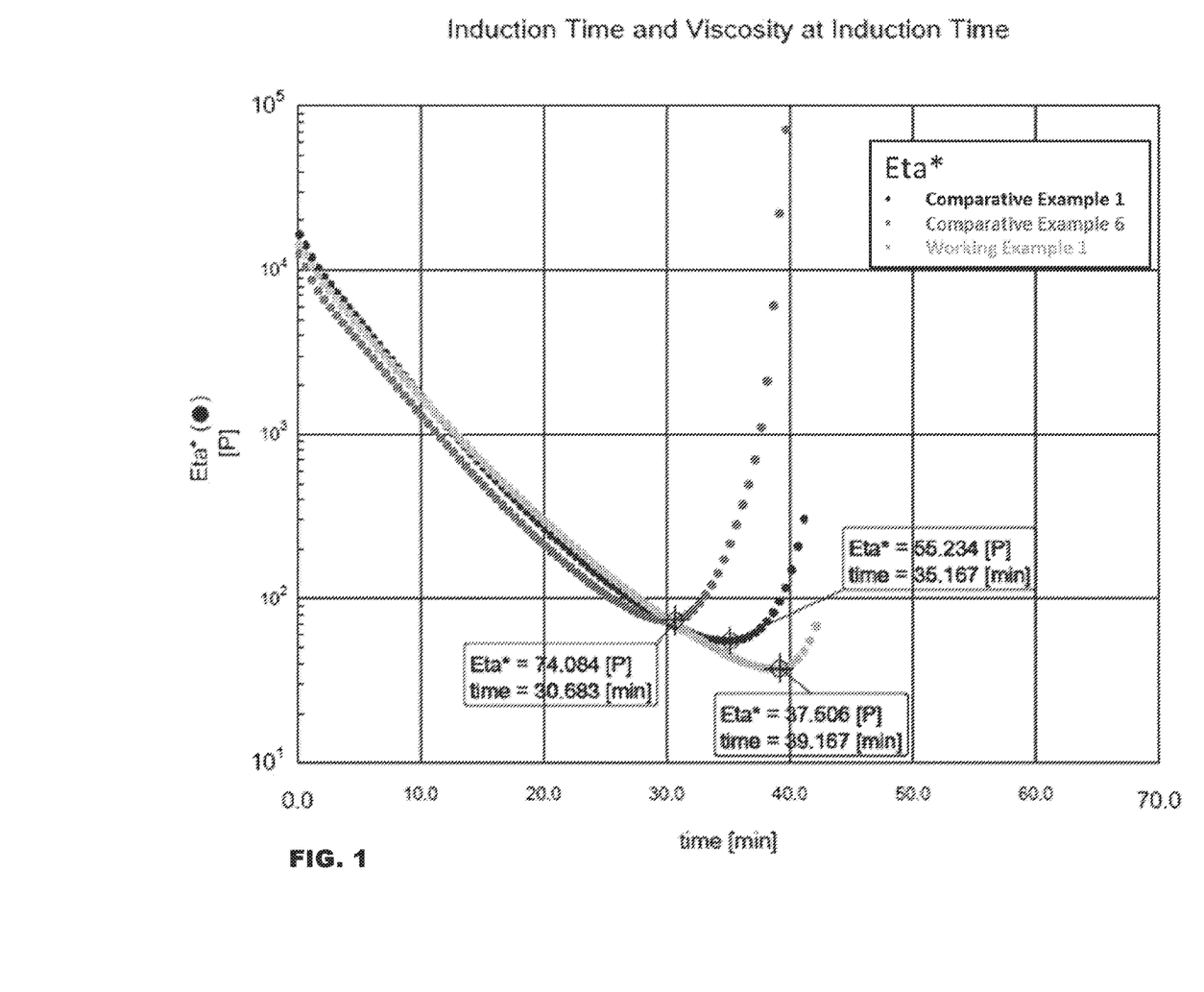
FIG. 1 shows viscosity of the epoxy resin composition as a function of cure time for working example 3 and comparative examples 2 and 3.

In the comparative example 1, the cured epoxy resin compositions obtained in the conditions 1 to 3 have a Tg's less than 160° C. since there is no tetraglycidyl amine contained in the composition. Then, the minimum viscosity is higher than that of example 1 and over 50 mPa·s, as shown in FIG. 1. Furthermore, the period of time to reach the minimum viscosity is shorter than that of example 1 and less than 36 min, as shown in FIG. 1. With these viscosity properties, the surface of the FRP material will have defects.

In the comparative example 2, the cured epoxy resin compositions obtained in conditions 1 to 3 have Tg's less than 160° C. since there is no dicyandiamide contained in the composition.

In the comparative example 3, the epoxy resin composition cannot be cured using conditions 1 to 3 since no aromatic urea is contained in the epoxy resin composition.

In the comparative example 4, the epoxy resin composition does not contain a first bisphenol epoxy; therefore the cured epoxy resin compositions obtained from conditions 1 to 3 are less than 70%. Furthermore, the surface of the cured FRP materials contains defects since the period of time to reach the minimum viscosity is less than 36 min.

In the comparative example 5, the cured epoxy resin compositions obtained from the cure conditions 1 to 3 have a Tg less than 160° C.

In the comparative example 6, the cured epoxy resin compositions obtained from the cure conditions 1 to 3 have a Tg than 160° C. Also the surface of FRP material contains defects since the minimum viscosity is higher than that of example 1 and over 50 mPa·s, as shown in FIG. 1.

TABLE 1

| | ITEM | EEW | UNIT | Working Examples | | | | | | | |
|---|---|---|---|---|---|---|---|---|---|---|---|
| | | | | 1 | 2 | 3 | 4 | 5 | 6 | 7 | 8 |
| Epoxy Resin | MY9655T | 126 | Weight Parts | 50 | 60 | 30 | 30 | 50 | 50 | 60 | 60 |
| | Epon 828 | 187 | Weight Parts | 30 | 20 | 50 | 0 | 40 | 10 | 20 | 20 |
| | Epon 1001F | 480 | Weight Parts | | | | | | | | |
| | Epon 3002 | 555 | Weight Parts | | | | | | | | |
| | Epon 2014 | 800 | Weight Parts | | | | | | | | |
| | Epon 2024 | 900 | Weight Parts | | | | | | | | |
| | Epon 2005 | 1300 | Weight Parts | 20 | 20 | 20 | | 10 | 40 | 20 | 20 |
| | EPN1138 | 178 | Weight Parts | | | | | | | | |
| Hardener | 4,4'-DDS | | Weight Parts | | | | | | | | |
| | Dicyandiamide | | Weight Parts | 5 | 5 | 5 | 5 | 5 | 5 | 7 | 4 |
| Aromatic urea | U-24M | | Weight Parts | 3 | 3 | 3 | 3 | 3 | 3 | 4 | 4 |
| Thermoplastic Resin | PVF-K | | Weight Parts | 5 | 5 | 5 | 5 | 5 | 5 | 5 | 5 |
| EEW of combination of bisphenol epoxy having EEW greater than 500 | | | g/eq | 1300 | 1300 | 1300 | 480 | 1300 | 1300 | 1300 | 1300 |
| Resin Properties | Curing Condition 1* (143° C. × 3 min.) | Gel Time | minutes | 3.7 | 3.8 | 3.7 | 3.9 | 3.8 | 3.7 | 3.6 | 3.9 |
| | | gel temperature | ° C. | 143 | 143 | 143 | 143 | 143 | 143 | 143 | 143 |
| | | Cured resinTg | ° C. | 198 | 185 | 175 | 178 | 185 | 185 | 179 | 176 |
| | | Cure degree | % | 76 | 78 | 80 | 76 | 72 | 79 | 79 | 75 |
| | | Delta G" | MPa | ≤15 | ≤15 | ≤15 | ≤15 | ≤15 | ≤15 | ≤15 | ≤15 |
| | | $K_{Ic}$ | MPa·m$^{1/2}$ | 0.8 | | | | | | | |
| | Curing Condition 2* (163° C. × 2 min.) | Gel Time | minutes | 3.5 | 3.5 | 3.5 | 3.4 | 3.6 | 3.5 | 3.3 | 3.6 |
| | | gel temperature | ° C. | 163 | 163 | 163 | 163 | 163 | 163 | 163 | 163 |
| | | Cured resinTg | ° C. | 182 | 176 | 168 | 167 | 168 | 172 | 169 | 165 |
| | | Cure degree | % | 94 | 95 | 96 | 94 | 93 | 95 | 96 | 93 |
| | | Delta G" | MPa | ≤15 | ≤15 | ≤15 | ≤15 | ≤15 | ≤15 | ≤15 | ≤15 |
| | Curing Condition 3* (177° C. × 2 min.) | Cured resinTg | ° C. | 181 | 175 | 167 | 165 | 167 | 170 | 168 | 164 |
| | | Cure degree | % | 98 | 98 | 99 | 97 | 97 | 98 | 99 | 96 |
| | Viscosity heated @ 2° C./min | minimum viscosity | mPa·s | 43 | 48 | 38 | 82 | 29 | 51 | 52 | 36 |
| | | priod of time reaching minimum viscosity | minutes | 33 | 32 | 33 | 32 | 32 | 33 | 32 | 34 |
| FRP material Properties | Curing Condition 1* (143° C. × 3 min.) | Tg | ° C. | 163 | — | — | — | — | — | — | — |
| | | Surface property | — | high | high | high | high | high | high | high | high |

TABLE 2

| | ITEM | EEW | UNIT | Working Examples | | | | | | |
|---|---|---|---|---|---|---|---|---|---|---|
| | | | | 9 | 10 | 11 | 12 | 13 | 14 | 15 |
| Epoxy Resin | MY9655T | 126 | Weight Parts | 50 | 50 | 50 | 50 | 50 | 50 | 50 |
| | Epon 828 | 187 | Weight Parts | 30 | 30 | 30 | 30 | 30 | 30 | 30 |
| | Epon 1001F | 480 | Weight Parts | | | 20 | 15 | | | |
| | Epon 3002 | 555 | Weight Parts | | | | | 20 | | |
| | Epon 2014 | 800 | Weight Parts | | | | 10 | | 20 | |
| | Epon 2024 | 900 | Weight Parts | | | | 5 | | | 20 |
| | Epon 2005 | 1300 | Weight Parts | 20 | | | | 10 | | |
| | EPN1138 | 178 | Weight Parts | | | | | | | |

TABLE 2-continued

| ITEM | | EEW | UNIT | Working Examples | | | | | | |
|---|---|---|---|---|---|---|---|---|---|---|
| | | | | 9 | 10 | 11 | 12 | 13 | 14 | 15 |
| Hardener | 4,4'-DDS | | Weight Parts | | | | | | | |
| | Dicyandiamide | | Weight Parts | 5 | 5 | 5 | 5 | 5 | 5 | 5 |
| Aromatic urea | U-24M | | Weight Parts | 7 | 3 | 3 | 3 | 3 | 3 | 3 |
| Thermoplastic Resin | PVF-K | | Weight Parts | 5 | 5 | 5 | 5 | 5 | 5 | 5 |
| EEW of combination of bisphenol epoxy having EEW greater than 500 | | | g/eq | 1300 | 480 | 543 | 990 | 555 | 800 | 900 |
| Resin Properties | Curing Condition 1* | Gel Time | minutes | 4.0 | 3.8 | 3.7 | 3.8 | 3.6 | 3.6 | 3.8 |
| | (143° C. × 3 min.) | gel temperature | ° C. | 143 | 143 | 143 | 143 | 143 | 143 | 143 |
| | | Cured resinTg | ° C. | 180 | 195 | 198 | 195 | 176 | 201 | 189 |
| | | Cure degree | % | 81 | 78 | 79 | 75 | 74 | 77 | 76 |
| | | Delta G" | MPa | ≤15 | ≤15 | ≤15 | ≤15 | ≤15 | ≤15 | ≤15 |
| | | $K_{Ic}$ | MPa · m$^{1/2}$ | | 0.6 | | | | | |
| | Curing Condition 2* | Gel Time | minutes | 3.2 | 3.5 | 3.5 | 3.5 | 3.5 | 3.4 | 3.5 |
| | (163° C. × 2 min.) | gel temperature | ° C. | 162 | 163 | 163 | 163 | 163 | 163 | 163 |
| | | Cured resinTg | ° C. | 171 | 179 | 182 | 181 | 169 | 182 | 176 |
| | | Cure degree | % | 97 | 95 | 95 | 94 | 94 | 94 | 94 |
| | | Delta G" | MPa | ≤15 | ≤15 | ≤15 | ≤15 | ≤15 | ≤15 | ≤15 |
| | Curing Condition 3* | Cured resinTg | ° C. | 170 | 177 | 180 | 179 | 168 | 180 | 177 |
| | (177° C. × 2 min.) | Cure degree | % | 99 | 98 | 98 | 97 | 98 | 97 | 98 |
| | Viscosity | minimum viscosity | mPa · s | 48 | 15 | 22 | 45 | 21 | 32 | 41 |
| | heated @ 2° C./min | priod of time reaching minimum viscosity | minutes | 31 | 32 | 32 | 33 | 32 | 32 | 33 |
| FRP material Properties | Curing Condition 1* (143° C. × 3 min.) | Tg | ° C. | — | — | — | 190 | 169 | — | — |
| | | Surface property | — | high | high | high | high | high | high | high |

TABLE 3

| ITEM | | EEW | UNIT | Comparative Examples | | | | | |
|---|---|---|---|---|---|---|---|---|---|
| | | | | 1 | 2 | 3 | 4 | 5 | 6 |
| Epoxy Resin | MY9655T | 126 | Weight Parts | 0 | 60 | 60 | 50 | 50 | 0 |
| | Epon 828 | 187 | Weight Parts | 40 | 20 | 20 | 50 | 30 | 40 |
| | Epon 1001F | 480 | Weight Parts | | | | | | |
| | Epon 3002 | 555 | Weight Parts | | | | | | |
| | Epon 2014 | 800 | Weight Parts | | | | | | |
| | Epon 2024 | 900 | Weight Parts | | | | | | |
| | Epon 2005 | 1300 | Weight Parts | 20 | 20 | 20 | | 20 | 20 |
| | EPN1138 | 178 | Weight Parts | 40 | | | | | 40 |
| Hardener | 4,4'-DDS | | Weight Parts | | 40 | | | | 10 |
| | Dicyandiamide | | Weight Parts | 5 | | 5 | 6 | 2.5 | 3 |
| Aromatic urea | U-24M | | Weight Parts | 3 | 4 | | 5 | 3 | 5 |
| Thermoplastic Resin | PVF-K | | Weight Parts | 5 | 5 | 5 | 5 | 5 | 5 |
| EEW of combination of bisphenol epoxy having EEW greater than 500 | | | g/eq | 1300 | 1300 | 1300 | — | 1300 | 1300 |
| Resin Properties | Curing Condition 1* | Gel Time | minutes | 3.5 | 5.0 | — | 3.6 | 5.0 | 3.7 |
| | (143° C. × 3 min.) | gel temperature | ° C. | 143 | 143 | — | 143 | 143 | 143 |
| | | Cured resinTg | ° C. | 130 | 110 | — | 200 | 140 | 110 |
| | | Cure degree | % | 75 | 50 | — | 50 | 60 | 65 |
| | | Delta G" | MPa | ≤15 | ≤15 | — | ≤15 | ≤15 | ≤15 |
| | | $K_{Ic}$ | MPa · m$^{1/2}$ | | | | 0.5 | | |
| | Curing Condition 2* | Gel Time | minutes | 3.5 | 4.5 | — | 3.2 | 3.9 | 3.5 |
| | (163° C. × 2 min.) | gel temperature | ° C. | 163 | 163 | — | 163 | 163 | 163 |
| | | Cured resinTg | ° C. | 141 | 130 | — | 234 | 154 | 121 |
| | | Cure degree | % | 95 | 80 | — | 69 | 90 | 97 |
| | | Delta G" | MPa | ≤15 | ≤15 | — | ≤15 | ≤15 | ≤15 |
| | Curing Condition 3* | Cured resinTg | ° C. | 121 | 136 | — | 235 | 158 | 125 |
| | (177° C. × 2 min.) | Cure degree | % | 98 | 83 | — | 69 | 92 | 98 |
| | Viscosity | minimum viscosity | mPa · s | 55 | 23 | 5 | 5 | 32 | 55 |
| | heated @ 2° C./min | priod of time reaching minimum viscosity | minutes | 28 | 45 | 80 | 35 | 41 | 28 |
| FRP material Properties | Curing Condition 1* (143° C. × 3 min.) | Tg | ° C. | — | — | — | — | — | — |
| | | Surface property | — | defective | defective | — | defective | defective | defective |

What is claimed is:

1. A resin composition having a Tg of at least 160° C. when cured at 143° C. for 3 min and also maintains a Tg of greater than 160° C. when cured at 177° C. for 1 min or longer, the resin composition comprising:
   (a) at least one tetraglycidyl amine having an EEW of 110 to 140 g/eq, wherein the at least one tetraglycidyl amine is present in an amount of 40 to 60 PHR per 100 PHR of total epoxy resin in the resin composition;
   (b1) at least one bisphenol epoxy having an EEW of 500 to 1500 g/eq, wherein the at least one bisphenol epoxy having an EEW of 500 to 1500 g/eq is present in an amount of 10 to 25 PHR per 100 PHR of the total epoxy resin in the resin composition;
   (b2) a single bisphenol epoxy having an EEW of 150 to 200 g/eq, wherein the single bisphenol epoxy having an EEW of 150 to 200 g/eq is present in an amount of 15 to 50 PHR per 100 PHR of total epoxy resin in the resin composition;
   (c) a dicyandiamide present in an amount of at least 3 PHR per 100 PHR of total epoxy resin in the resin composition; and
   (d) a 2,4'-toluene-bis-dimethyl-urea present in an amount of at least 0.5 PHR per 100 PHR of total epoxy resin in the resin composition,
   wherein the combined amounts of (a), (b1), and (b2) total 100 PHR of total epoxy resin in the resin composition;
   wherein the resin composition contains zero PHR of diaminodiphenylsulfone (DDS) per 100 PHR of total epoxy resin in the resin composition; and
   wherein the difference between a maximum G" value and a minimum G" value of the resin composition after being cured is no more than 15 MPa when the minimum G" value is measured in a temperature range of 55° C. to 140° C.

2. A prepreg comprising the resin composition of claim 1.

3. A fiber reinforced plastic material having a class A surface comprising the prepreg of claim 2, wherein the prepreg is cured.

4. The resin composition of claim 1, wherein (b1) has an EEW of 500 to 1000 g/eq.

5. A prepreg comprising the resin composition of claim 4.

6. A fiber reinforced plastic material having a class A surface comprising the prepreg of claim 5, wherein the prepreg is cured.

7. The resin composition of claim 1, wherein an amount of the 2,4'-toluene-bis-dimethyl-urea ranges from 0.5 to 7 PHR per 100 PHR of the total epoxy resin.

8. A prepreg comprising the resin composition of claim 7.

9. A fiber reinforced plastic material having a class A surface comprising the prepreg of claim 8, wherein the prepreg is cured.

10. The resin composition of claim 1, wherein an amount of the dicyandiamide is in a range of 3 to 7 PHR per 100 PHR of the total epoxy resin.

11. A prepreg comprising the resin composition of claim 10.

12. A fiber reinforced plastic material having a class A surface comprising the prepreg of claim 11, wherein the prepreg is cured.

* * * * *